Patented Jan. 19, 1937

2,068,204

UNITED STATES PATENT OFFICE 2,068,204

INDELIBLE INK

Burgess W. Smith, Rochester, N. Y., assignor to The Todd Company, Inc., Rochester, N. Y., a corporation of New York No Drawing. Application December 7, 1934, Serial No. 756,532

14 Claims. (Cl. 134—32)

This invention relates to the art of writing or printing documents such as wills, stock certificates, and, more particularly, checks, in which the payee's name, amount, date, and number are inserted, and where it is desirable that the writing or printing be of the greatest possible permanence and resistance to chemical substances that may be used to fraudulently obliterate such writing or printing, and it comprises inks of the so-called fraud preventing type containing synthetic dyes which are water-soluble and extremely resistant to the action of obliterating agents, and it further comprises ink transfer members, such as ribbons, pads and brushes impregnated with inks of the character specified, and it further comprises methods of indelibly inscribing documents.

Many ways have hitherto been proposed for printing or writing so-called permanent records, that is to say checks, bank notes, wills, deeds and other documents of like importance. What prior workers have searched for is some way of inscribing an insignia, such as the amount payable, on a check which insignia would be so indelibly fixed that no chemical agents could remove the writing without destroying the paper or so modifying its surface and substance that the attempted alteration is made obvious. This problem has been attacked from a number of angles.

Perhaps the earliest suggestion along this line was to use so-called indelible ink. One of the best of these is India ink. However, with the advent of mechanical devices, such as a checkwriter, for printing the figures on a check, the use of India inks is entirely precluded. This is because India ink is a water suspension of finely ground carbon which is not physically suited for printing from type due to its consistency and other physical properties, and when the composition is so modified that it is adaptable for such printing, the nature of the dispersion is changed. Moreover, India inks can be removed from the paper by organic detergents, or solvents of the compounds that may be introduced to modify the physical characteristics of this water dispersion of carbon.

Other types of so-called pigment indelible inks, are generally used as simple mechanical dispersions in a fluid vehicle. These are unsatisfactory because the colors are simply deposited on the paper. They are not fixed in the fibers of the paper.

Paper that is sufficiently sized to be used in checks does not admit of appreciable penetration of an ink compounded of an insoluble pigment and to prevent the removal of writing made with such an ink it has been the practice to shred or otherwise mutilate the paper during the printing operation so that penetration is increased. This mutilation is open to some limitations in that it weakens the paper, increases the thickness at that point so that the documents do not pile flatly, and is not wholly effectual in impregnating the fibers of the paper with coloring matter.

More recently it has been proposed to use certain dyes of the azo type. In some instances the azo color is the result of a chemical reaction occurring within the paper. In other cases the insoluble azo dye is simply used in admixture with a suitable fluid chemical. Records printed or inscribed with such dyestuffs are not wholly satisfactory. Many of the dyestuffs used can be readily bleached by oxidation or reduction; many others are soluble in various solvents. Still others can be chemically converted to dyestuffs which in turn can be rendered colorless. For example, one dyestuff known as metanil yellow, and one which is not suitable for my invention; dyes textile fibers yellow. By treatment of the yellow colored material with an acid the color is changed to a magenta which can be reduced by sodium bisulphite to a colorless material.

Recently it has also been found that many of the so-called permanent inks hitherto used could be readily removed by means of organic liquids having detergent properties and hence any coloring matter which can truly be said to be suitable in this art, must be resistive to such materials. In fact, its resistance to organic detergents (as distinguished from ordinary soap solutions) is an exceptionally accurate way of determining the usefulness of the ink. It has been found that such solvents, which are generally basic organic nitrogen compounds, will dissolve from the paper many inks hitherto used. This action is both a solvent and detergent action. The organic liquids having this property tend to dissolve any oily vehicle associated with the pigment and they also remove the pigment itself by detergent action. That is to say, they are good dispersing agents for the pigment so that particles of pigment once dislodged from the paper by the action of these materials become dispersed in the fluid. This is somewhat like the detergent action of soap solutions.

Lately, in view of the difficulties in developing a satisfactory ink, various other solutions of the problem have been suggested. It has for instance been proposed to incorporate chemical substances in the body of the paper itself, the substances being ones which, when writing on the paper is submitted to chemical bleaching agents, would change color, or develop color, and thus indicate a fraudulent attempt to obliterate the writing. Many ingenious proposals along this line are a part of the prior art and hence the art has largely resorted to the use of a modified paper that is to say, one which will indicate that attempts have been made to obliterate writing or printing thereon. Regardless of these prior proposals, the fact remains that a desirable way of unalterably inscribing or printing the sum payable, date, number, etc. on a check would be by means of an ink which would actually be indelible, one which could not be obliterated by chemical agents without destroying the paper, one which would not be removed by organic solvents or detergents, and one which could be used on an ordinary untreated paper, yet have the fibers of the paper absorb the coloring matter of the ink and hold it tenaciously. Moreover, such an ink must meet additional tests of utility before being acceptable. For instance, its color constituent must be one which can be incorporated in suitable liquid vehicles to give a composition which can be used satisfactorily in ink pads, inking ribbons and other mechanical ink supply devices in addition to ordinary writing pens, etc. The requirements are all the more strict when such inks are used in mechanical ink transfer devices such as checkwriters. These employ ink supply means such as ribbons or pads and are not usually in continuous use. Therefore, an ink to be suitable for this specific field must have non-drying properties. Otherwise, ribbons and pads carrying the ink will dry out rapidly and harden and frequent cleaning of the machine and replacement of the ink supply means is necessary.

The prior art may be epitomized by stating that hitherto no one has succeeded in preparing an ink which meets these requirements.

Accordingly, I have set myself to the problem of finding inks which meet the requirements of this art, namely, high water solubility so that the actual fibers of the paper will be impregnated with the coloring matter, extraordinary resistance to obliterating agents and suitability for incorporation in liquid vehicles which can be used in printing mechanism such as check writers.

I have now discovered that there are certain dyestuffs which satisfactorily answer the above purposes when incorporated in suitable vehicles. Among them are soluble vat dyes. Nearly all of these vat dyes have high molecular weight with a somewhat complex molecular structure and readily attach themselves in molecular union with the fibers of the paper. This phenomenon is entirely different from the deposition of pigments deposited from ordinary inks. In the latter case the fiber-pigment union is merely mechanical, whereas, in the former it has been well established that the union actually involves molecular combination between dyestuffs and fiber. These dyestuffs act as substantive, or direct cotton colors, when on the fiber.

The soluble vat dyes are not new materials. Within the past few years they have been used to an increasing extent in the dyeing and printing of fabrics but such dyes have never hitherto been used in inks for the printing of records, checks, etc. which must withstand willful attempts to remove the writing or printing.

The class of vat dyes which I advantageously use are, as stated, known as the "soluble" vat colors. These substances are chemically referred to as the soluble ester salt of the reduced form of vat dyes and this includes vat dyes of the anthraquinone and indigo series. They are sold under various well known trade names. For example, the Soledons and soluble Honsoles are the soluble forms of the Caledons. The Indigosols are the soluble forms of indigo. Generally, the salt is the sulfuric acid ester of the leuco base of the corresponding insoluble dye. For reference to the soluble leuco ester salts of dyes of the anthraquinone series I refer to U. S. Patent 1,790,759 to Morton et al. A large number of dyes of this class are described therein, and there are many other patents describing such dyes. For the Indigosols reference is made to U. S. Patent 1,448,251 to Bader and Sunder.

As stated, these leuco ester salts are soluble in water which is essential to my invention. It means that the fibers of paper printed with aqueous non-drying inks containing these dyes are wetted by the water solution of the dye and hence the color can penetrate into the fibers themselves. In this way, the fiber itself of the paper is actually dyed with the dyestuff. The color is not just laid on the fiber as is the case with inks containing insoluble colors or pigments.

These dyes, as stated, possess marked resistance to willful removal. If the amount payable on a check be printed or written with an ink containing a leuco ester salt and then subjected to acid or alkaline oxidizing agents, such as hypochlorites, the leuco ester salt is converted to the vat dye base. This may be accompanied by a change in color, but the writing or printing is not obliterated. Hence, oxidizing agents used to remove printing made with inks hitherto used simply serve to bind the writing even more fully to the paper. Reducing agents in ordinary use and suitable for use on the paper also have no effect on the dyes I use and thus my inks will give printing or writing which cannot be willfully removed without actual destruction of the paper for further used as a document. Although the dyes as used are initially water soluble, I find that plain water will not remove them from the paper even though they be in the soluble leuco ester state. This indicates that the fibers of the paper take up the leuco ester in a substantive fashion. This may be due to oxy-celluloses of the fiber or the normal and ordinary constituents of the paper as distinguished from the pure cellulose of cotton cloth for instance, but I am not prepared to state just what happens. I content myself with noting the observable facts that writing or printing with the soluble ester salt cannot be removed with plain water. In the case of textile dyeing and printing, it is necessary to subject the leuco compounds to fixing agents such as acid vapors and oxidizing agents. I do not need to do this in my invention. Use of my dyes in aqueous vehicles to form inks is entirely different from preparing printing pastes used in textile printing. These pastes are generally thickened materials and must be of such consistency that they can be caused to flow into the crevices of intaglio printing rolls and then be transferred in paste-like condition to the textile fabric. As stated, they are always developed on the textile fiber by subsequent treatment. In their initial condition (as pastes) they do not wet the fibers of the fabric to any great extent and the fibers of the textile do not take up the dye in the paste to anywhere near the extent that the dye in my inks is absorbed in the paper. However, as stated, if the leuco ester writing be subjected to oxidizing agents for the purpose of obliterating the writing, the leuco ester compounds are immediately converted to the insoluble oxidized vat dye and are even more firmly bound to the paper. These dyes are known to be very resistant to the action of organic liquid detergents or solvents. This is because the dye has actually become molecularly united to the fibers of the paper and cannot be removed by any commonly known solvents or detergents.

I shall now describe my invention with particular reference to one member of the leuco ester salts of the anthraquinone series, it being understood however, that other soluble leuco ester salts of this and the indigo series (the Indigosols) can be used.

Soluble Ponsole Jade Green, or Soledon Jade Green, is a typical leuco ester salt. It is the soluble sodium salt of the sulfuric ester of dimethoxydibenzanthrone (see U. S. Patent 1,790,759 above). It is currently purchasable in the open market as a water soluble paste. I make my inks from this paste by mixing about three parts of the commercial paste with one part of a water miscible ink vehicle such as glycerine, ethylene glycol, triethanolamine or other similar material. This, of course, is to give the proper fluidity to the ink and to also give a compounded ink which will not dry out when ink supply members such as ribbons and pads are saturated therewith. The liquid vehicles I use are advantageously hydroscopic and miscible with water. The final ink may contain varying amounts of water. For ink pads and ribbons, the quantity of hydroscopic material (it having a viscosity somewhat greater than water) can be larger than the amount present in the more highly fluid inks used for hand writing. It is, of course, understood that those skilled in the art can adjust the quantities of dye paste, water and hydroscopic material to give an ink of the desired fluidity or "body" for the purpose intended. Generally, I simply mix the commercial paste with the vehicle in about the proportions given and allow the mixture to stand for awhile until some of the water therein has evaporated and the remainder is in equilibrium with the normal atmosphere. This would happen in any event when the mixture of paste and vehicle are used in ink ribbons or pads. As stated, I use hydroscopic vehicles because they retain water in the ink which is advantageous.

Hence, this specific ink, in its broad aspects, comprises an aqueous mixture of a hydroscopic liquid and a soluble vat dyestuff. I am, however, aware that glycerine has been used in printing pastes (but not in inks) as dye assists in the printing of textile fabrics. I make no claim to this.

When making up my ink for use with ordinary pens of fountain pens, I simply mix ordinary water with the commercial dye paste of the soluble color. Ordinarily, the dye paste is diluted with about five to ten parts of water so that the fluid ink obtained consists of a mixture of about one part of soluble color dissolved in twenty-five parts of water. In the ordinary fountain pen ink there is no necessity for including a hydroscopic material. One great advantage present in the inks of my invention is that should a fountain pen ink tend to thicken due to evaporation of water, the ink can be thinned out to the proper consistency by merely adding enough water to accomplish this. Most fountain pen inks hitherto used, aside from being readily obliterated, tend to precipitate insoluble substances on standing.

An ink made from soluble Ponsole or Soledon Jade Green as described above will have a red color and printing or writing made therefrom will initially be colored red. Oxidation in the air will, after a long period of time, convert this red color to a green. The application of the usual oxidizing ink eradicators either alkaline or acid will at once convert the red color to a green and fix the writing or printing even more firmly in the paper. Organic detergents or solvents have absolutely no effect except perhaps to change the color of the writing. Hence, in the application of Ponsole Jade Green to the practice of my invention, I am actually printing or inscribing with the leuco derivative of a vat dyestuff and the inscribed writing or printing first appears in the color of the leuco compounds. Changes in color after the printing are not at all disadvantageous because the characters of the writing or printing remain the same. The color however, is even more firmly bound to the paper.

It will be apparent that there are many modifications of my ink. As stated, I can vary the dye over a wide range and can use any of the fairly numerous soluble vat colors. Many different vehicles can be used. These vehicles will all contain water since the dye used is water soluble and the fibers are more readily wetted by water. Thus the ink may comprise the soluble dye, water and glycerine, the fluidity of the ink being regulated so that ink pads and ribbons can be saturated with the ink and the ink thereon can be readily transferred from pad to type and to paper. As stated the proper fluidity of the ink, and hence its relative proportions of constituents is a matter which can be determined in ways well known to the art. Naturally I avoid forming the thick pastes hitherto used in printing textiles with the dyes of my invention. Proportions of constituents are not particularly critical but the final product must be a fluid ink and not a paste.

I sometimes find it advantageous to incorporate perhaps two or three percent of a reducing agent in the ink. This is to maintain the dye constituent in the soluble leuco ester salt state over relatively long periods of time. Sodium formaldehyde sulfoxylate is satisfactory for this purpose. But these leuco ester salts are so stable over long periods of time that this expedient is ordinarily unnecessary.

Some of the leuco dyes used in my invention may have no color in the leuco or reduced state. When using dyes of this character I find it advantageous to incorporate a small amount of a pigment color or aniline dye in the ink. This serves to make the writing visible and when ink eradicators are applied to the writing the leuco dye is immediately converted to the colored oxidized form. Preferably the pigment should have the same color as that of the oxidized, colored dye. Of course, oxidation to the colored form may take place fairly rapidly in the air also.

In fact, I find it sometimes advantageous to incorporate oxidizing agents in the paper itself. Thus, for instance, I can incorporate small amounts, of the order of 1 percent or less of potassium chlorate, sodium perborate, and other oxidizing agents in the paper stock. Then when my ink is used for printing on such papers, the oxidizing agent in the paper immediately converts the soluble leuco dye to the insoluble dye base. This is especially useful when using inks which contain colorless leuco compounds. Mordants such as aluminum oxide can also be incorporated in the paper but since the dyes I am using have a marked affinity for paper fibers there is very little advantage gained by using a mordant. I can, of course, print on a paper stock which contains a small amount of a wetting out agent to assist in the penetration of the dye, or, alternatively, small amounts of wetting out agents can be added to the ink, but these expedients, while they possess some advantages, are not necessary to the successful practice of my invention.

As stated, my inks are especially suitable for use in connection with mechanical printing devices such as checkwriters. I can further enhance the permanency of the writing by using a printing machine such as a checkwriter or typewriter. The action of these machines during the printing operation, tends to mechanically force the ink into the pores and fibers of the paper. This is also facilitated by the use of machines of the shredding type. But regardless of the method of applying the ink to the paper, the inks of my invention are permanent and indelible, and resist all attempts at obliteration.

The permanence of ordinary writing ink, commonly known as an "iron-gallo-tannate" ink, is well known and is invariably recommended by authorities for use in the preparation of valuable records. This ink, when properly made, resists for a long period of time the ravages of time and normal atmospheric influences and is not readily removable from the paper by either mechanical abrasion or long soaking in water. This is due to the fact that the black coloring matter exists in actual chemical solution as an almost colorless ferrous compound and as such can penetrate into the fiber of the paper and is oxidized into an insoluble black pigment after the ink is dry. Usually there is present a dye that serves the purpose of a temporary color until the natural oxidation produces the insoluble black. The insoluble ferric complex, being in and beyond the surface of the paper, it resists erasure by abrasion, unless the surface is appreciably removed. Long immersion in water does not remove it as the developed coloring is insoluble to a very high degree. It has the serious defect, however, that it is readily removable so completely that it defies detection in either the original form or the insoluble oxidized state by the application of acids, such as oxalic, or mild bleaching agents, such as a weak solution of permanganate of potash or hypochlorite of soda. Prior to my invention, there has been no ink offered the public comparable with the iron ferro gallic ink for stability to ordinary conditions and resistance to mechanical erasure. Inks made in accordance with my invention have all of the good properties of the iron gallo tannic inks, with the additional feature of the resultant oxidized coloring matter, not only known to be imperishable over decades of time under normal conditions, but to resist any change by re-agents ordinarily used to remove writing.

Although I have placed emphasis on the use of water soluble vat dyes, I wish it to be understood that I do not consider that the present invention is to be restricted to this class of soluble dyes. So far as I am aware I am the first to describe a fraud preventing ink containing a water soluble dye (as distinguished from insoluble pigments and colloidal dispersions of insoluble dyes), and a suitable vehicle therefor, the dye being one which cannot be obliterated with oxidizing or reducing chemicals (although the color may change) and which cannot be removed by means of organic liquid detergents or solvents which function to dislodge the particles of color and disperse them in the solvent. Therefore, I am claiming my invention broadly in the appended claims.

Having thus described my invention, what I claim is:—

1. An indelible and fraud preventing ink for use on paper comprising a solution of an aqueous liquid vehicle which is non-drying by evaporation and a water soluble leuco ester salt of a vat dye dissolved therein, the aqueous non-drying vehicle constituting at least the principal liquid vehicle of the ink.

2. The ink as in claim 1 wherein the dye is chosen from the group consisting of the anthraquinone and indigo series.

3. The ink as in claim 1 wherein the dye is a leuco ester salt of a dimethoxy dibenzanthrone.

4. The ink as in claim 1 wherein the dye is soluble Ponsole Jade Green.

5. An indelible and fraud preventing ink for use on paper comprising an aqueous vehicle containing a hydroscopic liquid to render the vehicle non-drying and a water soluble leuco ester salt of a vat dye dissolved therein, the aqueous non-drying vehicle constituting at least the principal liquid vehicle of the ink.

6. The ink as in claim 5 wherein the dye is chosen from the group consisting of the anthraquinone and indigo series.

7. The ink as in claim 5 wherein the dye is a leuco ester salt of a dimethoxy dibenzanthrone.

8. The ink as in claim 5 wherein the dye is soluble Ponsole Jade Green.

9. An indelible and fraud preventing ink for use on paper comprising a fluid aqueous solution containing a water soluble leuco ester salt of a vat dye dissolved therein, the aqueous vehicle constituting at least the principal liquid vehicle of the ink.

10. The ink as in claim 9 wherein the dye is chosen from the group consisting of the anthraquinone and indigo series.

11. The ink as in claim 9 wherein the dye is a leuco ester salt of a dimethoxy dibenzanthrone.

12. The ink as in claim 9 wherein the dye is soluble Ponsole Jade Green.

13. An indelible and fraud preventing ink for use on paper comprising a fluid solution of an aqueous vehicle, a water soluble leuco ester salt of a vat dye dissolved therein, and a small amount of a pigment color or ordinary aniline dye.

14. The ink as in claim 5 wherein the hydroscopic liquid is glycerine.

BURGESS W. SMITH.